Sept. 13, 1927.
E. J. HART
TWO-CYCLE ENGINE
Filed Aug. 4, 1926
1,642,655
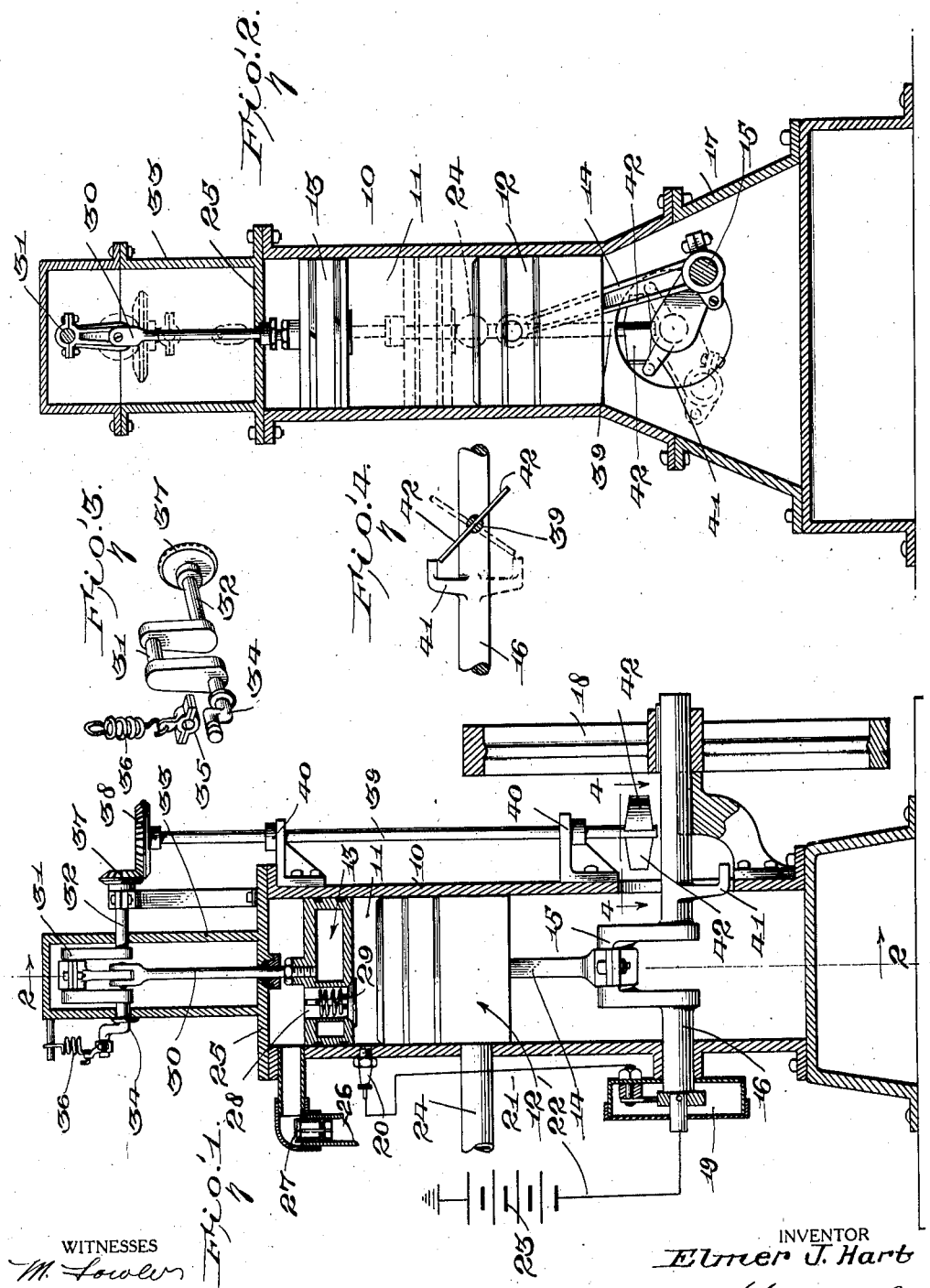
INVENTOR
Elmer J. Hart
BY
ATTORNEYS
WITNESSES Patented Sept. 13, 1927.

1,642,655

UNITED STATES PATENT OFFICE.

ELMER J. HART, OF VANCOUVER, WASHINGTON.

TWO-CYCLE ENGINE.

Application filed August 4, 1926. Serial No. 127,105.

My present invention relates generally to two-cycle engines whose most common defect is the lack of thorough exhaust of the burned gases after each explosion and the failure to take in uniform quantities of combustible mixture. The power to be derived from an internal combustion engine of this type is such as to place considerable premium upon uniform operation in the above respects, and it is the primary object of my invention to provide such an arrangement as to promote substantially thorough exhaust or scavenging after each explosion, as well as the supply of a uniform combustible mixture to the explosion chamber after it has been scavenged.

In the accompanying drawing which illustrates my present invention and forms a part of this specification:—

Figure 1 is a central vertical sectional view taken through my improved two cycle engine;

Figure 2 is a similar view taken at right angles to Fig. 1;

Figure 3 is a detail perspective view of the crank shaft of the charging and scavenging piston, and, Figure 4 is a detail horizontal section taken substantially on line 4—4 of Fig. 1.

Referring now to these figures my invention purposes a two cycle engine including a cylinder 10 in which a combustion chamber 11 is formed betwen a main piston 12 and a supplemental piston 13, the action of the latter of which will presently appear.

The main piston 12 has a connecting rod 14 leading to the crank 15 of the main crank shaft 16, the latter mounted in one end of the crank portion 17 of the cylinder 10, and projecting exteriorly thereof at its ends through suitable bearings in order that the crank shaft may receive external operating parts including a fly wheel 18 and a make and break ignition device 19. The ignition device 19 operates in connection with a circuit controlling the firing of the charge within the combustion chamber 11 through a spark plug 20, the circuit including wires 21 and 22 and a battery 23.

The main piston 12 moves toward the crank case portion 17 of the cylinder 10, during its power stroke and as it nears the end of its stroke the piston uncovers the exhaust port through one side of the cylinder 10 opening into an exhaust pipe 24.

The supplemental piston 13 is mounted adjacent to the piston or head end 25 of the cylinder inwardly beyond the intake port of the cylinder which opens into an intake pipe 26 having therein a valve 27 closing in a direction away from the cylinder. Moreover the piston 13 has a port therethrough as at 28, controlled by a valve 29, which closes toward the intake port and thus when the piston 13 moves inwardly or toward the main piston 12, a charge will be sucked into the space between the supplemental piston and the cylinder head 25 through the intake pipe 26. When the piston pipe 13 moves in the opposite direction or toward the cylinder head 25, the charge previously sucked into the space between the piston 13 and cylinder head 25 will be forced through the piston port 28, the valve 29 opening to admit the charge which is thus pumped by the piston 13 into the combustion chamber 11. At this time the valve 27 in the intake pipe 26 remains closed by the pressure of the charge trapped between the piston 13 and the cylinder head 25.

It is intended moreover, that the supplemental piston 13 shall move toward the main piston 12 when, nearing the end of its power stroke, the main piston uncovers the exhaust port, so that in its inward movement toward the main piston 12 the supplemental or charging piston 13 will act to thoroughly scavenge the combustion chamber by forcing the products of the previous combustion outwardly through the exhaust pipe 24. This scavenging movement of the supplemental piston 13 continues during the completion of the power stroke of the main piston 12 and until this piston has started on its succeeding compression stroke and has reached a point where it is about to again close the exhaust port. The supplemental piston then quickly moves in the opposite direction or toward the cylinder head so as to force the charge into the combustion chamber 11 ahead of the advancing main piston 12.

It is for the above purposes that the supplemental piston 13 is provided with a jointed connecting rod 30 upstanding through the cylinder or head 25 and connected to the crank 31 of a shaft 32 journalled through a support 33 mounted on the cylinder head. This shaft 32 has at one end an offset extension 34 on which a collar 35 is rotatable. To the collar 35 is connected one end of a spring 36 whose opposite end is anchored to the support 33 for the shaft 32.

At its opposite end the shaft 32 has a small bevel gear 37 in mesh with a larger bevel gear 38, the latter mounted at the upper end of a shaft 39 journalled in bearings 40 attached to the cylinder 10, the shaft 39 paralleling the cylinder with its lower end disposed adjacent to the main crank shaft 16.

The main crank shaft 16 has an angular outstanding finger 41 located adjacent to the lower end of the shaft 39 and the latter is provided with a pair of diametrically opposed outstanding wings 42, one of which is disposed in the path of movement of the finger 41, during each revolution of the main crank shaft 16.

The parts are so related that upon each retreating movement of the main piston 12 during the power stroke and as the main piston 12 uncovers the exhaust port the finger 41 engages one of the wings 42 and rotates shaft 39 through 90 degrees during exhaust of the combustion chamber and the initial advancing movement of the main piston 12 until it it about to close the exhaust port. During this quarter rotation of the shaft 39 from the position shown in full lines in Fig. 4 to the position shown in dotted lines, the crank shaft 32 of the supplemental piston will be given a half revolution through the gears 37 and 38 and during this half revolution of crank shaft 32 the supplemental piston 13 will be advanced toward the main piston 12. This advancing movement of the supplemental piston is thus accomplished during the completion of the power stroke of the main piston 12 and the initial portion of its subsequent compression stroke or in other words, during the time when the exhaust port is uncovered by the main piston.

When the crank 31 is turned downwardly at the end of this half revolution of shaft 32, and as it passes its central lower point, the finger 41 of the main crank shaft 16 having turned the shaft 39 from the position shown in full lines in Fig. 4 to the position shown in dotted lines, releases from the wing 42 at a time when the spring 36 comes into action to draw the offset extension 34 of shaft 32 upwardly and thus bring about retreating movement of the supplemental piston 13 as the main piston 12 advances on its compression stroke.

The above cycle is repeated during each revolution of the main crank shaft 16 and it is obvious that in view thereof the combustion chamber 11 will be thoroughly scavenged during each power stroke of the piston, and as the piston nears the end of the power stroke and subsequently starts its next compression stroke. The same means utilized to bring about thorough combustion of the scavenging chamber is employed to insure the pumping of uniform charges of combustible mixture into the combustion chamber during the initial portion of each compression stroke, and thus the explosions will not only be continuous and of uniformly full power, but the engine as a whole will be improved, its operation rendered more stable and its general effectiveness and efficiency increased.

I claim:

1. A two cycle engine including a cylinder having intake and exhaust ports, main and supplemental pistons located in spaced opposing relation within the cylinder, and forming therebetween a combustion chamber, the supplemental piston being located between the main piston and the intake port and having means to force a combustible charge from the intake port into the combustion chamber upon its movement in a direction away from the main piston, a crank shaft with which the main piston is connected, a second crank shaft with which the supplemental piston is connected, a shaft along the cylinder geared at one end to the crank shaft of the supplemental piston and having diametrically opposed outstanding arms adjacent to the crank shaft of the main piston, said latter crank shaft having an angular finger for engagement during the rotation of the crank shaft with one of the arms of the said shaft to rotate the latter and advance the supplemental piston toward the main piston, and spring means engaging the crank shaft of the supplemental piston for shifting the latter away from the main piston whereby the complete stroke of the supplemental piston will be occomplished during a portion of the stroke of the main piston.

2. A two cycle engine including a cylinder having intake and exhaust ports, main and supplemental pistons located in spaced opposing relation within the cylinder, and forming therebetween a combustion chamber, said supplemental piston being provided with a valve to admit a combustible mixture to the combustion chamber, a crank shaft connected with the main piston, a second crank shaft connected with the supplemental piston, a shaft geared at one end to the crank shaft of the supplemental piston and having diametrically opposed arms adjacent to the crank shaft of the main piston, said latter crank shaft having a finger for engagement with one of the arms of the crank shaft to rotate the later and advance the supplemental piston toward the main piston, and spring means engaging the crank shaft of the supplemental piston for shifting the supplemental piston away from the main piston whereby the complete stroke of the supplemental piston will be accomplished during a portion of the stroke of the main piston.

ELMER J. HART.